(12) United States Patent
Taylor (10) Patent No.: US 11,850,885 B2
(45) Date of Patent: *Dec. 26, 2023

(54) WHEEL FOR INDUSTRIAL VEHICLE

(71) Applicant: Fredrick Taylor, Rome, GA (US)

(72) Inventor: Fredrick Taylor, Rome, GA (US)

(*) Notice: Subject to any disclaimer, the term of this patent is extended or adjusted under 35 U.S.C. 154(b) by 569 days.

This patent is subject to a terminal disclaimer.

(21) Appl. No.: 17/034,728

(22) Filed: Sep. 28, 2020

(65) Prior Publication Data

US 2021/0008924 A1 Jan. 14, 2021

Related U.S. Application Data (63) Continuation-in-part of application No. 15/637,137, filed on Jun. 29, 2017, now Pat. No. 10,787,030.

(60) Provisional application No. 62/357,712, filed on Jul. 1, 2016.

(51) Int. Cl.
  *B60B 3/02* (2006.01)
  *B60B 3/00* (2006.01)
  *B62D 55/096* (2006.01)
  *B60B 9/04* (2006.01)

(52) U.S. Cl.
  CPC .............. *B60B 3/02* (2013.01); *B60B 3/005* (2013.01); *B60B 3/007* (2013.01); *B60B 9/04* (2013.01); *B62D 55/0966* (2013.01)

(58) Field of Classification Search
  CPC .. B62D 55/14; B62D 55/145; B62D 55/0966; B60B 9/00; B60B 9/04; B60B 3/002; B60B 3/005; B60B 3/007; B60B 3/02; B60C 7/00; B60C 7/06; B60C 7/10; B60C 7/14; B60C 7/143
  See application file for complete search history.

(56) References Cited

U.S. PATENT DOCUMENTS

| | | | |
|---|---|---|---|
| 3,894,776 | A | 7/1975 | Black |
| 4,253,510 | A | 3/1981 | De Lorean |
| 4,350,196 | A | 9/1982 | Hampshire |
| 4,923,257 | A | 5/1990 | Purcell |
| 4,950,030 | A | 8/1990 | Kindel et al. |
| 5,293,948 | A | 3/1994 | Crabb |
| 5,312,176 | A | 5/1994 | Crabb |
| 6,068,350 | A | 5/2000 | Baumgarten et al. |
| 6,293,630 | B1 | 9/2001 | Separautzki et al. |

(Continued)

FOREIGN PATENT DOCUMENTS

| | | |
|---|---|---|
| CN | 1585701 A | 2/2005 |
| WO | 2015/150333 A2 | 10/2015 |

OTHER PUBLICATIONS

European Office Action for Application No. 17 821 219.7, dated Jul. 21, 2022, pp. 1-6.

(Continued)

*Primary Examiner* — Jason R Bellinger
(74) *Attorney, Agent, or Firm* — Thomas|Horstemeyer, LLP (57) ABSTRACT

This disclosure concerns wheels for industrial vehicles, including scissor lift vehicles and aerial platform vehicles. More particularly, this disclosure concerns a wheel fabricated with a substantially cylindrical wheel rim and a front face surface which includes a center hub section that is inwardly offset from the front edge by an amount and at an angle providing flexibility to recover from incidences that can damage the wheel.

20 Claims, 12 Drawing Sheets

(56) References Cited

U.S. PATENT DOCUMENTS

| | | |
|---|---|---|
| 9,033,431 B1 | 5/2015 | Zuchoski et al. |
| 9,050,853 B2 | 6/2015 | Kataoka |
| 10,787,030 B2 * | 9/2020 | Taylor ..................... B60B 9/00 |

OTHER PUBLICATIONS

Chinese Office Action for Application No. 201780041285.5, dated Dec. 21, 2021, pp. 1-11 (Translation Included).

* cited by examiner

WHEEL FOR INDUSTRIAL VEHICLE

CROSS-REFERENCE TO RELATED APPLICATIONS

This application is a continuation-in-part of U.S. patent application Ser. No. 15/637,137 filed Jun. 29, 2017, now U.S. Pat. No. 10,787,030, issuing Sep. 29, 2020, which claims the benefit of and priority to U.S. Provisional Application Ser. No. 62/357,712, having the title "WHEEL FOR INDUSTRIAL VEHICLE," filed on Jul. 1, 2016, each of which is incorporated herein in by reference in its entirety.

TECHNICAL FIELD

This disclosure concerns wheels for industrial vehicles. More particularly, this disclosure concerns a wheel for scissor lift vehicles, aerial work platform vehicles, ground support equipment vehicles and similar industrial vehicles.

BACKGROUND

Scissor lift and aerial platform vehicles are a type of industrial vehicle utilized in numerous interior and exterior applications to aid in reaching otherwise inaccessible areas. A scissor lift vehicle includes an extendable platform that can be extended vertically to a higher elevation. The wheels on such vehicles need to contribute to the maneuverability, mobility, and stability of the vehicle. Also such vehicles are often abused. For example, it is common that wheels on an industrial vehicle may be run into a curb or other obstacle or effectively dropped from a height for example by running the vehicle off of an incline or curb dropping to a lower surface rather abruptly and violently that can result in denting, bending or knocking out of round a conventional wheel.

SUMMARY

The present disclosure presents a wheel design for a scissor lift, aerial platform vehicles, ground support equipment vehicles, and other industrial vehicles. The wheels on these vehicles must have the maneuverability to move to and accurately position at, under, or near the desired work location. For example, a scissor lift vehicle is designed to extend, generally vertically, to reach otherwise inaccessible areas, thus changing the center of gravity as the platform extends. The present wheel design provides improved stability and load transfer carrying capacity of the vehicle, as well as other industrial vehicles. Further, it can be advantageous that the wheel have the flexibility to survive the various abusive situations that can result in damaging a conventional wheel.

Briefly described, the present disclosure provides a wheel to be used with an industrial vehicle. In one or more aspects, the wheel is configured to provide improved maneuverability and/or flexibility to recover from incidences that can damage the wheel, for example running into a curb, or dropping from a height. The wheel provides a light weight structure, having strength to flex on impact and resist bending, allowing it to return to its original shape after impact. In various non-limiting aspects, the wheel comprises a rim to be used with a rubber tire. The wheel can be a metal rim, for example a one piece metal wheel. The wheel can also be made of two or more pieces assembled together such as by welding. The vehicle can be an industrial vehicle such as a scissor lift, aerial work platform, forklift or other industrial vehicle. The wheel can be used for construction equipment, asphalt paving equipment airport ground support equipment and surface cleaning equipment vehicles. In an aspect, the wheel can be used on any industrial vehicle having a maximum speed of about 30 miles per hour.

In an embodiment, a wheel for an industrial vehicle is provided. In any one or more aspects it can be formed or fabricated in one piece. In other aspects it can be formed of two or more pieces that can be assembled together, such as by welding the pieces together. The wheel can comprise a substantially cylindrical wheel rim including opposed first and second annular edges and a rim base there between, the rim base extending from the first annular edge to the second annular edge; a hub aperture; a surface extending radially from the hub aperture to the first annular edge of the wheel rim; and a back flange formed extending inwardly from the second annular edge of the wheel rim, the back flange formed at an angle with respect to the rim base, wherein the surface comprises a center hub section about the hub aperture, a transition section extending radially outwardly from the center hub section, and an outer annular face section extending radially outwardly from the transition section to the first annular edge of the wheel rim, and wherein the wheel has a longitudinal axis passing through hub aperture, the longitudinal axis being parallel to the longitudinal axis of an axle to which the wheel is configured to be mounted and a center line passing vertically through a cross-section of the wheel, the center line being equidistantly spaced between the first and second annular edges.

In any one or more aspects, the outer annular face section can be positioned outwardly along said longitudinal axis towards the first annular edge from the center hub section. The center hub section can extend radially outwardly from the hub section. The center hub section can have a substantially planar cross-section and the outer annular face section can have a substantially planar cross-section. The center hub section can have a substantially planar cross-section that lies on the vertical center line. The substantially planar cross-section of the center hub section and the substantially planar cross-section of the outer annular face section can be substantially parallel to each other, and the center hub section can be offset from the center line outwardly towards the outer annular face section or inwardly towards the back flange. The substantially planar cross-section of the center hub section can lie on the center line. The substantially planar cross-section of the outer annular face section or the substantially planar cross-section of the center hub section or both can be substantially perpendicular to the substantially planar cross-section of the rim base. The transition section can have a substantially planar cross-section. The transition section can extend outwardly from the center hub section at an angle B and the angle B can be in the range of about 15 to about 80 degrees with respect to the center line. The outer annular face section can extend outwardly from the transition section at an angle C and the angle C can be in the range of about 100 to about 165 degrees with respect to the center line. The center hub section can extend outwardly from the hub aperture at an angle A of substantially 90° with respect to the longitudinal axis. The back flange can be substantially planar in cross-section. The rim base can be substantially planar in cross-section. The wheel can comprise a concave step between the outer annular face and the wheel rim. The wheel can comprise a convex large radius section between the outer annular face and the wheel rim. The wheel can comprise an angled section between the outer annular face and the wheel rim. The wheel can be a one piece design that is formed by stamping a metal piece. The metal piece can be steel. In one or more aspects, the thickness of the metal piece can be in the range of about 2 mm to about 4-5 mm or more. In various aspects the thickness of the metal piece can be at least 3 mm. The wheel rim can be designed to receive and secure in place a tire. The angle between the wheel rim and the back flange can be an angle F in the range of anywhere between about 45 degrees to about 135 degrees (or 90° plus or minus 45° or less) with respect to a planar surface of the rim base or with respect to the longitudinal axis or both. The back flange can have a distal end opposite the second annular edge, and the back flange can be configured such that the distal end of the back flange faces towards the longitudinal axis. The back flange can have a length that is at least twice the thickness of the back flange. The industrial vehicle can be selected from the group consisting of a scissor lift vehicle, an aerial platform vehicle and other industrial vehicles, such as ground support equipment.

Other systems, methods, features, and advantages of the present disclosure for a wheel for industrial vehicles will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Described below are various embodiments of the present systems and methods for a wheel for industrial vehicles, such as a scissor lift wheel. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications, and equivalents included within the spirit and scope of the disclosure.

The present wheel is designed to attach to the hub of an axle of a vehicle, in particular an industrial vehicle, and is formed in one piece having a unique look, flexibility and strength. In an aspect, the wheel can be for use on a scissor lift vehicle an aerial platform vehicle, or ground support equipment. The wheel has a front side which faces away from the vehicle and a back side that faces toward the vehicle. The wheel can be made from a metal material, such as steel or a high strength metal material. In some aspects, the metal can be steel or aluminum. In some aspects the high strength material can be an alloy, or a high strength composite material. In some aspects, the wheel can be formed by stamped metal, spun metal, cast metal, flow-formed, or other metal-metal working processes. In various aspects, the stamped metal can have a thickness in the range of about 2 mm or more, about 2.5 mm or more, or about 3 mm or more. In various aspects, the thickness of the stamped metal can have a thickness in the range of about 2 mm to about 6 mm, about 2.5 mm to about 5.5 mm, about 3 mm to about 5 mm, or anywhere in between. In any one or more aspects, the wheel diameter can be between 7 to 30 inches, and any range there between. For example, the wheel diameter can be between 8 to 30 inches, 9 to 30 inches, 10 to 30 inches, 12 to 28 inches, 14 to 26 inches, 16 to 24 inches, 18 to 22 inches, or about 20 inches. In other aspects, the wheel diameter can be greater than 30 inches.

Figure 1A:
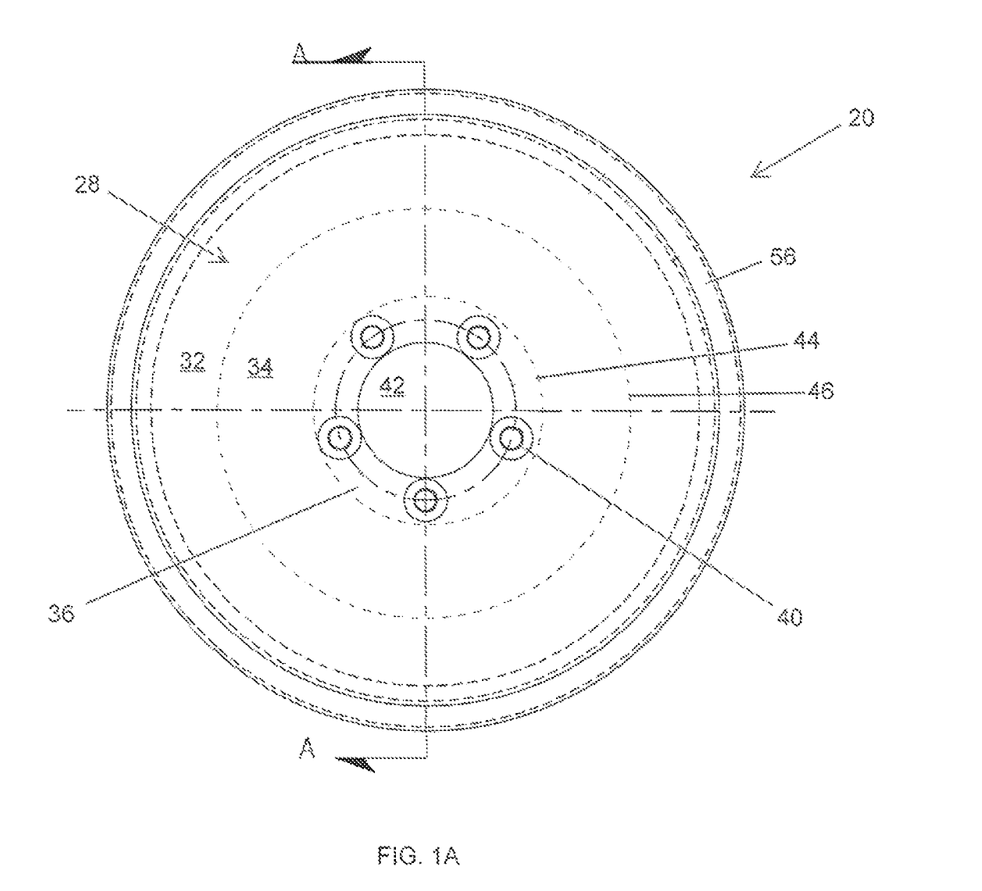
FIGS. 1A and 1B illustrate a front view and a cross-sectional view, respectively, of a non-limiting embodiment of a wheel of the present disclosure.
Figure 1B:
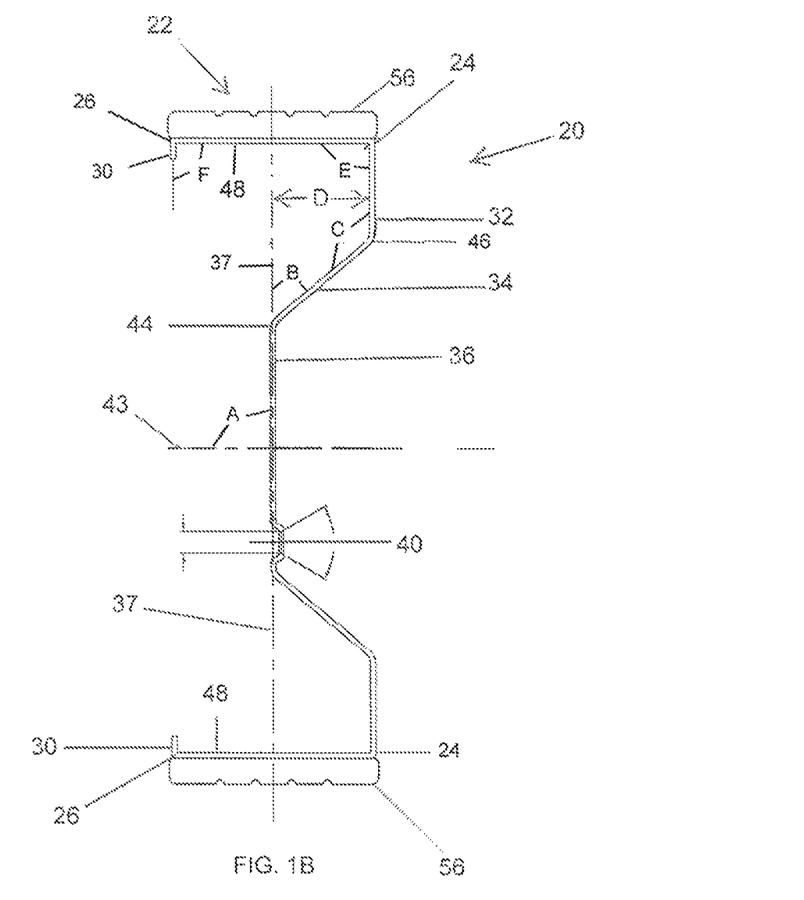

Referring now in more detail to the drawings, in which like numerals indicate like parts throughout the several views, FIGS. 1A and 1B illustrate an example of a wheel of the present disclosure. The wheel 20 includes a substantially cylindrical wheel rim 22 about the periphery of the wheel 20. The wheel rim 22 includes a first annular edge 24 an opposed second annular edge 26, and a rim base 48 there between extending from the first annular edge 24 to the second annular edge 26. The wheel 20 also has a front face surface 28 and an opposed back flange 30. The opposed back flange 30 extends inwardly from the wheel rim base 48 at the opposed second annular edge 26 towards an axle on which the wheel is configured to be mounted. The axle can have a longitudinal direction or axis 43.

The front face surface 28 includes an outer annular face section 32 extending inwardly from the first annular edge 24 of the wheel rim base 48 leading to a transition section 34. Transition section 34 extends inwardly from the annular face section 32 to a center hub section 36 which is inwardly offset by an offset depth D from the annular face section 32 to the center hub section 36 by the transition section 34. In various embodiments, the offset depth D of the center hub section 36 can be dependent on the specific use. In a non-limiting example, an industrial vehicle, such as a scissor lift vehicle, can require a specific wheel offset to meet the load transfer requirements as the vehicle platform extends. In some embodiments, the offset D is neutral at the wheel center line 37, the wheel center line running vertically through a cross-section of the wheel and being located equidistantly between the first annular edge 24 and the second annular edge 26. In other embodiments, the center hub section 36 is not neutral at the wheel center line 37 and, instead, can have an offset D closer to the annular face section 32 or closer to the back flange 30. In some aspects where the offset D is not neutral to the center line 37, the offset D can be plus or minus 30% of the distance between the center line 37 and either the annular face section 32 or the back flange 30 from the center line 37 towards either the annular face section 32 or the back flange 30, or less. As an example, for a wheel 4 inches wide between the annular face section 32 and the back flange 30, the offset D can be plus or minus 1, 2 inches, or less, from the center line 37 towards either the annular face section 32 or the back flange 30. In various embodiments, the wheel 20 can have an annular corner profile 50 (see, e.g., FIGS. 2, 3B, 5 and 6) at the first annular edge 24 and the face exterior edge 38.

The center hub section 36 extends outwardly from the longitudinal axis 43 at an angle A with respect to the longitudinal axis 43. In any one or more aspects, the angle A at which the center hub section 36 extends outwardly from the longitudinal axis 43 can be 90° plus or minus 10°, 9°, 8°, 7°, 6°, . . . 1°, or plus or minus 0°. In an aspect, the angle A at which the center hub section 36 extends outwardly from the longitudinal axis 43 is substantially 90°.

In any one or more aspects, the center hub section 36 can be substantially planar in cross-section, such as depicted in FIG. 1B. In other aspects, the center hub section need not be substantially planar in cross-section and may be non-planar in cross-section. In the case where the center hub section 36 is not substantially planar in cross-section, a line can be drawn from the point at which the center hub section 36 meets the hub aperture 42 to the hub perimeter 44 where the center hub section 36 meets the transition section 34, and this line can be used to determine the angle A of the center hub section with respect to the longitudinal axis 43. The center hub section 36 can contain bolt apertures 40 disposed radially about a hub aperture 42 within the center hub section 36. In some embodiments, there can be at least 3 bolt apertures. In some aspects, the bolt apertures 40 can be chamfered at a specified angle (see, e.g., FIGS. 1B and 8B). In other aspects, the bolt apertures 40 can be flush with the center hub section 36 (see, e.g., in FIG. 2).

The front face surface 28 can continue from a perimeter 44 of the center hub section 36 through the transition section 34 to an interior edge 46 of outer annular face section 32. The hub perimeter 44 thus provides a first transition angle B between center hub section 36 and transition section 34, the interior edge 46 providing a second transition angle for transition section 34. In any one or more aspects, the front face surface 28 can continue from the center hub perimeter 44 through the transition section 34 at an angle B that is less than 90° with respect to center line 37. In various aspects, angle B can range from 15° to 80° or anywhere in between, for example from 20° to 75°, 25° to 70°, 30° to 65°, etc. For example, in any one or more aspects, the angle B between the center hub section 36 and the transition section 34 can be: 45° plus or minus 10°, 9°, 8°, 7°, 6°, . . . 1°, or plus or minus 0°; 65° plus or minus 10°, 9°, 8°, 7°, 6°, . . . 1°, or plus or minus 0°; or 70° plus or minus 10°, 9°, 8°, 7°, 6°, . . . 1°, or plus or minus 0°. In any one or more aspects of the various embodiments, transition section 34 can be substantially planar in cross-section, such as depicted in FIG. 1B. The transition section 34 can extend directly from the center hub section 36 without an intermediate bend or break in the transition from the center hub section 36 at center hub perimeter 44.

In any one or more aspects, the front face surface 28 can continue from the transition section 34 through the interior edge 46 of outer annular face section 32 at an angle C that is greater than 90° with respect to the planar cross-section of transition section 34. In any one or more aspects, angle C can range from 100° to 165°, or anywhere in between, for example 105° to 160°, or 110° to 155°, etc., with respect to an outer face of the outer annular face section 32 parallel to the center line 37. For example, in any one or more aspects, the angle C can be: 110° plus or minus 10°, 9°, 8°, 7°, 6°, . . . 1°, or plus or minus 0°; 120° plus or minus 10°, 9°, 8°, 7°, 6°, . . . 1°, or plus or minus 0°; 130° plus or minus 10°, 9°, 8°, 7°, 6°, . . . 1°, or plus or minus 0°; or 135° plus or minus 10°, 9°, 8°, 7°, 6°, . . . 1°, or plus or minus 0°.

In any one or more aspects, each of the center hub section 36, transition section 34 and the outer annular face section 32 can be substantially planar in cross-section that in conjunction with angles B and C can increase structural strength and load carrying capacity of the wheel. In other aspects, the transition section 34 and/or the outer annular face section 32 need not be substantially planar in cross-section and may be non-planar in cross-section (see e.g. FIG. 8B). In the case where the transition section 34 is not substantially planar in cross-section, a line can be drawn from the point at which the transition section 34 meets the hub perimeter 44 of the center hub section to where the transition section 34 meets the outer annular face section 32 at interior edge 46 which line can be used to determine the angle B. Similarly, in the case where the outer annular face section 32 is not substantially planar in cross-section a line can be drawn from the interior edge 46 to where the outer annular face section 32 meets the rim base 48 at the first annular edge 24 and this line can be used to determine the angle C of the outer annular face section 32 with respect to the transition section 34 and also the angle E of the outer annular face section 32 with respect to the rim base 48.

In any one or more embodiments, the interior edge 46 can be spaced inwardly from the outside diameter of the wheel 20 outer surface (namely, from the first annular edge 24) towards the longitudinal axis 43. In various aspects, the outer annular face section 32 and the center hub section 36 can be substantially planar in cross-section, as shown for example in FIG. 1B. The planar cross-section of the outer annular face section 32 can be substantially parallel to the planar cross-section of center hub section 36. The planar cross-section of both the outer annular face section 32 and the center hub section 36 can be substantially perpendicular to longitudinal axis 43. The planar cross-section of the outer annular face section 32 can be offset at the offset D from the planar cross-section of center hub section 36. Rim base 48 continues from the outer annular face section 32 through first annular edge 24 at an angle E. In any one or more aspects, the rim base 48 can be substantially planar. In any one or more aspects, angle E can range from 90° plus or minus 10°; 90° plus or minus 8°, 90° plus or minus 6°, 90° plus or minus 5°, 90° plus or minus 4° or 90° plus or minus 3°. In an aspect angle E can be substantially 90°. The planar cross-section of the rim base 48 can be substantially perpendicular to the outer annular face section 32 and substantially parallel to longitudinal axis 43. In other aspects, rim base 48 can be non-planar. For example, rim base 48 can have a drop towards the longitudinal axis 43 of anywhere from 3° to 10° from either or both first annular edge 24 or second annular edge 26 running towards the center of rim base 48, for example to where the vertical center line 37 intersects rim base 48. In such case, however, a planar line can be drawn between first annular edge 24 and second annular edge 26 and the angle E can be determined with respect to the plane defined by such planar line.

In any one or more embodiments, the outer annular face section 32 can intersect at the first annular edge 24, which can provide a corner profile 50 (FIG. 2) in a basic configuration. In other embodiments, an annular corner profile 50 can be defined between the first annular edge 24 and the face exterior edge 38. The rim base 48 can extend about 2 to 8 inches, and any range there between, from the first annular edge 24 back to the second annular edge 26 toward the vehicle.

A back flange 30 extends inwardly from the second annular edge 26 of the rim base 48. The back flange can provide resistance to bending of the wheel and add strength and support to the wheel. It can increase load carrying capacity and resistance to deflection without shape failure of the wheel. The back flange 30 can have a distal end opposite the second annular edge 26, and the back flange can be configured such that the distal end of the back flange faces towards the longitudinal axis 43. In any one or more aspects the back flange 30 can have a planar cross-section. The back flange 30 can be formed at an angle F with respect to the distal end of the back flange and a planar cross-section of the rim base 48, a plane formed by a line extending from the first annular edge 24 and the second annular edge 26, or with respect to the longitudinal axis 43. In one or more aspects, the angle F can be about 90° with respect to the rim base 48, said plane or the longitudinal axis 43, being substantially perpendicular thereto. The angle F can be 90° plus or minus 45° (i.e., in the range of anywhere between about 45° to about 135°), or less, with respect to either the rim base 48, said plane or the longitudinal axis 43. For example, the angle F can be 90° plus or minus 42°, 90° plus or minus 40°, 90° plus or minus 38°, 36°, 34°, 32°, 30°, . . . or plus or minus 0° (i.e., about 48° to about 132°, about 50° to about 130°, about 52° to about 125°, . . . , etc.) with respect to the rim base 48, said plane or the longitudinal axis 43, extending generally inwardly toward the longitudinal axis 43 of the wheel 20. In any one or more aspects, the back flange can have a substantially planar cross-section and the planar cross-section of the back flange can be substantially parallel to the radial center line 37.

In any one or more aspects, the length of the flange 30 extending inwardly from the rim base 48 can be twice the material thickness of the flange 30. The length of the flange can be five to eight times the material thickness of the flange 30. In some embodiments, the transition angles are distinct. In other embodiments, the transition angles have a radius of curvature (such as depicted by corner profile 50). In some aspects, the radius of curvature can be dependent on the size of the wheel and material thickness. As shown in FIG. 1B, a tire 56 can be bonded or secured to the substantially flat rim base 48. In other embodiments, a tire 56 can be mounted to or secured to a substantially flat rim base 48 and the annular corner profile 50 to form a wheel assembly.

Figure 2:
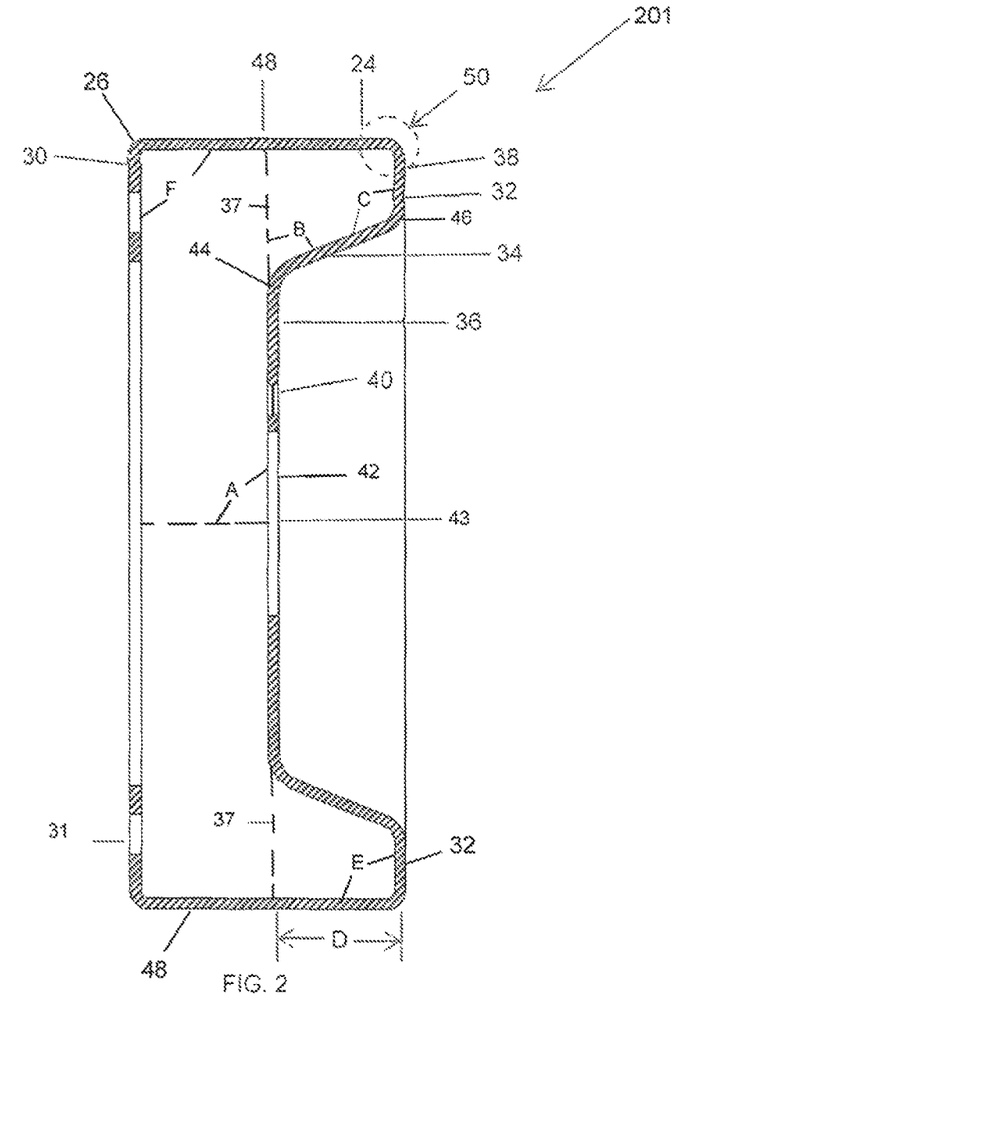
FIG. 2 is illustrates a cross-sectional view of an alternate embodiment with a basic corner profile at the first annular edge according to the present disclosure.

As depicted in the embodiments of FIG. 1B and FIG. 2, it can be seen that the cross-section of the wheel above the longitudinal axis 43 can be formed of sections that combine to form a question-mark in cross-section. In the embodiments depicted in FIG. 1B and FIG. 2, for example, a vehicle can be positioned to the left side of the wheel. It is possible, however, that the vehicle can also be positioned to the right side of the wheel depicted in FIG. 1B and FIG. 2, thus reversing the configuration of the wheel.

FIG. 2 illustrates the cross-section of an embodiment of a wheel 201 according to the present disclosure illustrating a corner profile 50 in a basic configuration at the first annular edge 24. The outer annular face section 32 of the front face surface 28 meets the rim base 48 with a bend that can be about 90 degrees. The wheel can have an offset depth D, between the outer annular face section 32 of the front face surface 28 and the center hub section 36, as described above. In this example, the back flange 30 is extended with a locking feature or mechanism 31 that can be based on customer specific requirements.

As depicted in FIG. 2, the embodiment therein can further vary in relation to the embodiment of FIG. 1B in regards to the angle B between the center hub section 36 and transition section 34 and also angle C between transition section 34 and outer annular face section 32. In the embodiment of FIG. 2, angle B is greater that of the embodiment of FIG. 1B, while angle C is less than that of the embodiment of FIG. 1B. For example, in the embodiment depicted in FIG. 2, angle B and angle C can range as described above.

Figure 3A:
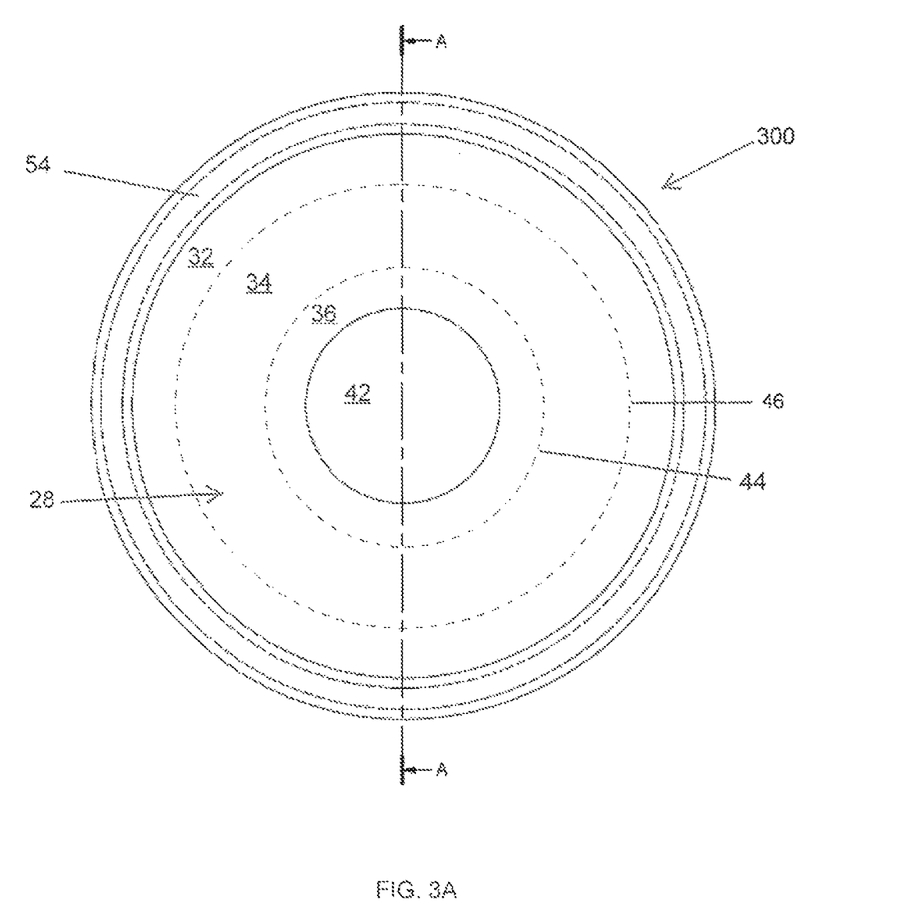
FIGS. 3A and 3B illustrate a front view and a cross-sectional view, respectively, of a non-limiting embodiment of a wheel of the present disclosure.
Figure 3B:
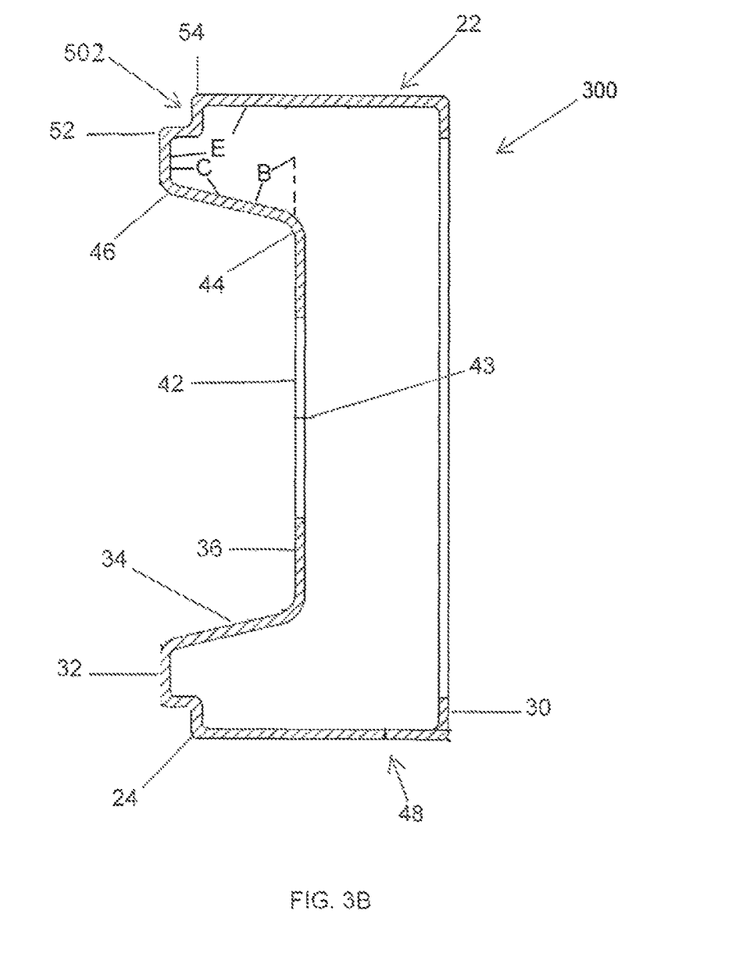

In another non-limiting embodiment, FIGS. 3A and 3B illustrate an example of a wheel 300 formed with a hub aperture 42 in center hub section 36. The wheel 300 continues along center hub section 36 outward from the hub aperture 42 to the center hub perimeter 44 and continues through a transition section 34 at an angle B about the center hub perimeter 44 ranging from about 20 degrees to about 65 degrees, and any range there between, to the interior edge 46 of the outer annular face section 32. Outer annular face section 32 extends from interior edge 46 to a corner profile 502 from which rim base 48 extends. The interior edge 46 is spaced inwardly from the wheel rim base 48 of the rim 22 of the wheel 300. In various aspects, the outer annular face section 32, the transition section 34 and the center hub section 36 can each be substantially planar in cross-section, as shown for example in FIG. 3B. The planar cross-section of the outer annular face section 32 can be substantially parallel to the planar cross-section of center hub section 36. The cross-section of the center hub section 36 can be offset inwardly from the cross-section of the annular face section 32 at an off-set D as described above.

In any one or more embodiments, a concave step can be formed in the corner profile 502 before turning from the outer annular face section 32 to the rim base 48. The annular corner profile 50 can include a step 54 and have a shoulder 52. In various aspects, shoulder 52 can be spaced about 1 to 2 inches from and generally parallel to the rim base 48 of wheel rim 22. The step 54 can turn 90 degrees from shoulder 52 to form a step ring generally parallel to the face of the wheel 300, before turning 90 degrees to the rim base 48. The rim base 48 can extend about 2 to 8 inches away from the front face surface back toward the vehicle. A back flange 30 can extend from rim base 48 and be formed with a bend of about 60 to 100 degrees radially inward toward the hub aperture 42 of the wheel 300. In some embodiments, the transition angles are distinct. In other embodiments, the transitions have a radius of curvature.

Figure 4A:
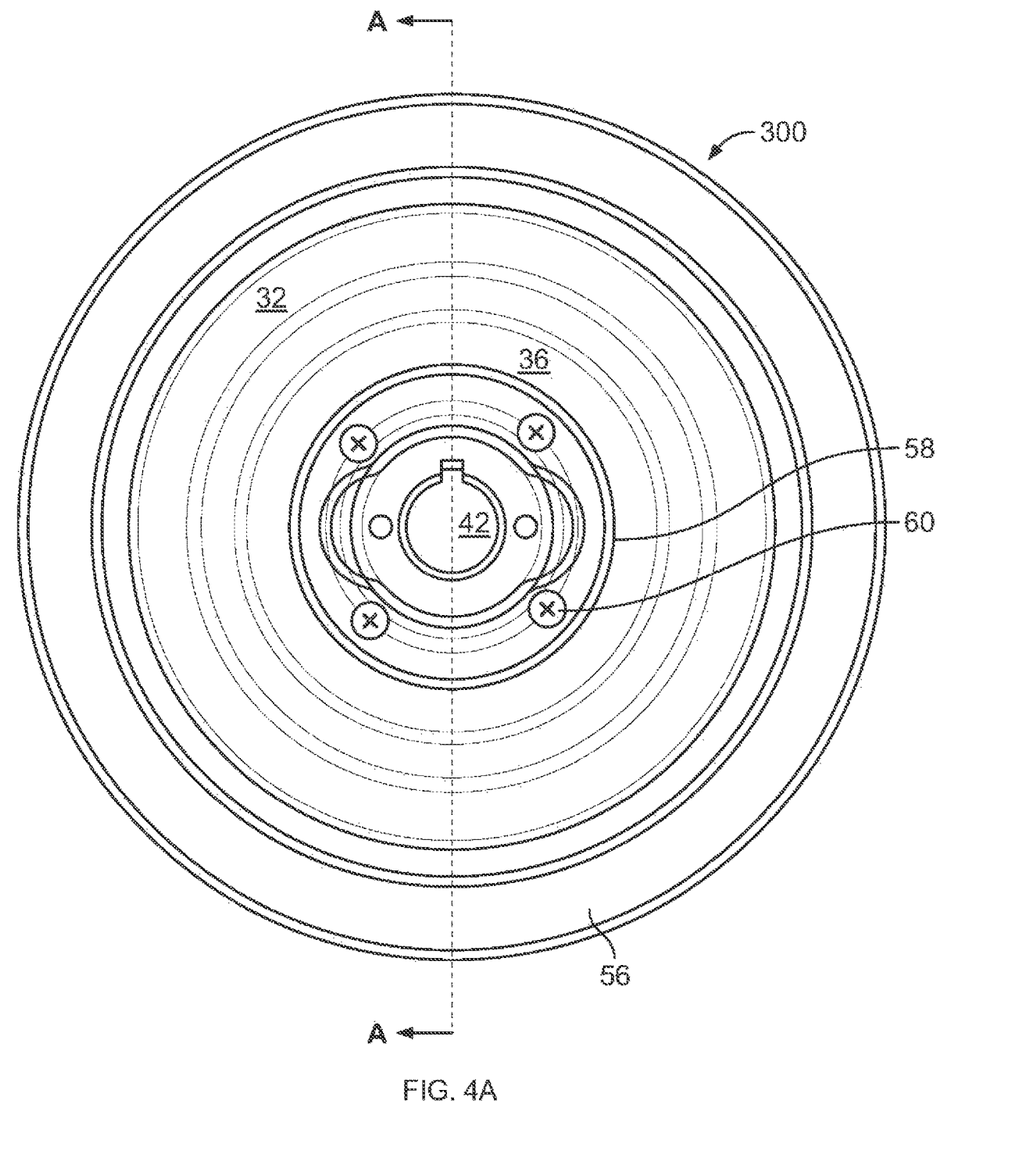
FIGS. 4A and 4B illustrate a front view and a cross-sectional view, respectively, of an embodiment of a wheel assembly, including the embodiment shown in FIGS. 3A and 3B.
Figure 4B:
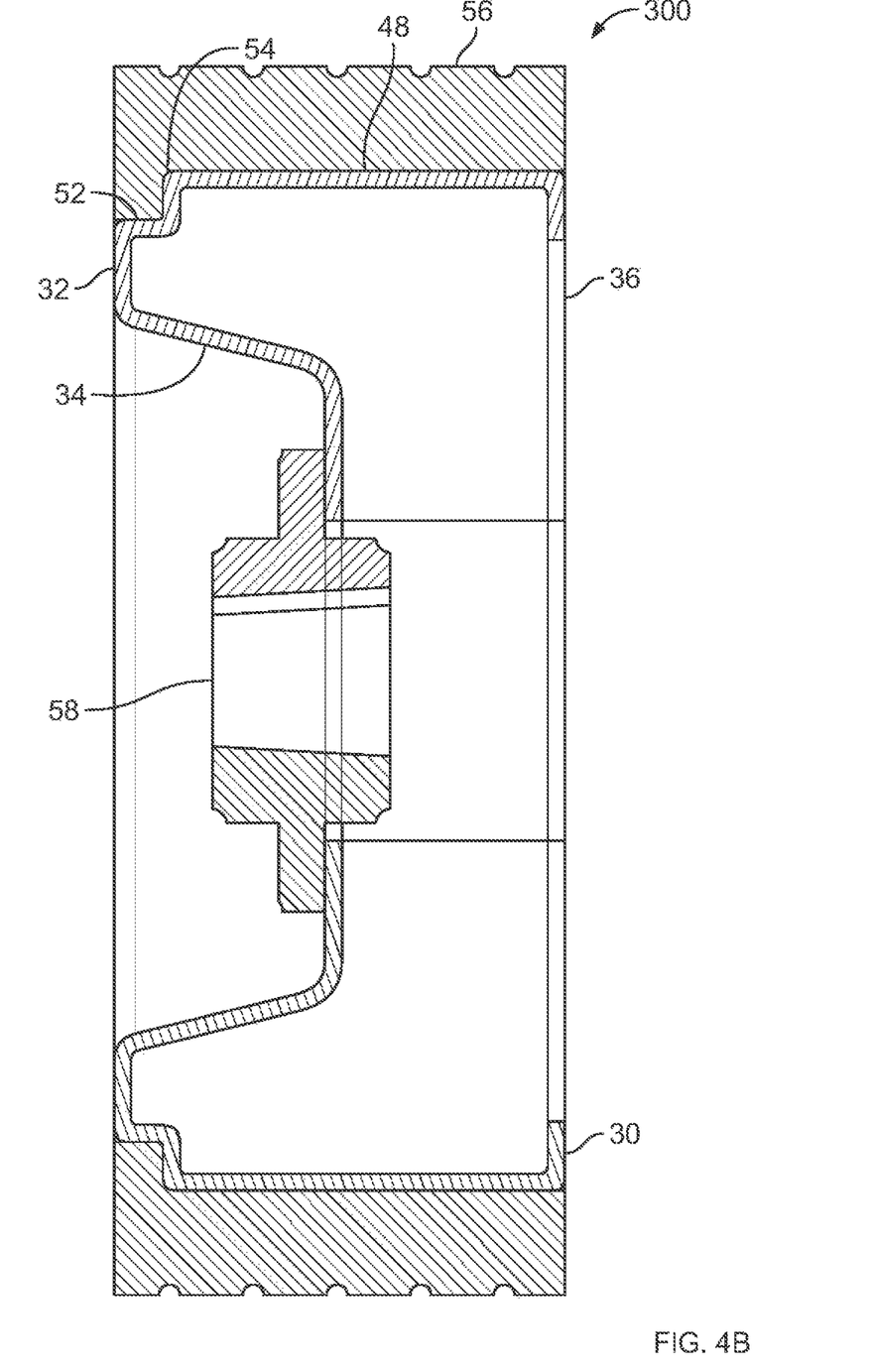

Illustrated in FIGS. 4A and 4B is a non-limiting example of a complete wheel assembly according to various aspects of the present disclosure comprising the wheel 300, a tire 56, and locking hub attachment 58. In this particular embodiment the tire 56 is configured to mate with the annular corner profile 502 of FIGS. 3A and 3B. In any one or more embodiments, the wheel can be attached to the hub of the axle of a vehicle at a hub aperture 42. The wheel can be secured to the vehicle using a locking hub attachment 58, which can use a plurality of screws 60 to secure the locking hub attachment 58 in place. The example of FIGS. 4A and 4B depicts the embodiment of the wheel 300 of FIGS. 3A and 3B. However, one skilled in the art will recognize the embodiment of FIGS. 1A and 1B and FIG. 2 can also be used for the assembly along with a tire configured to mate with the surface of the rim 22.

Figure 5:
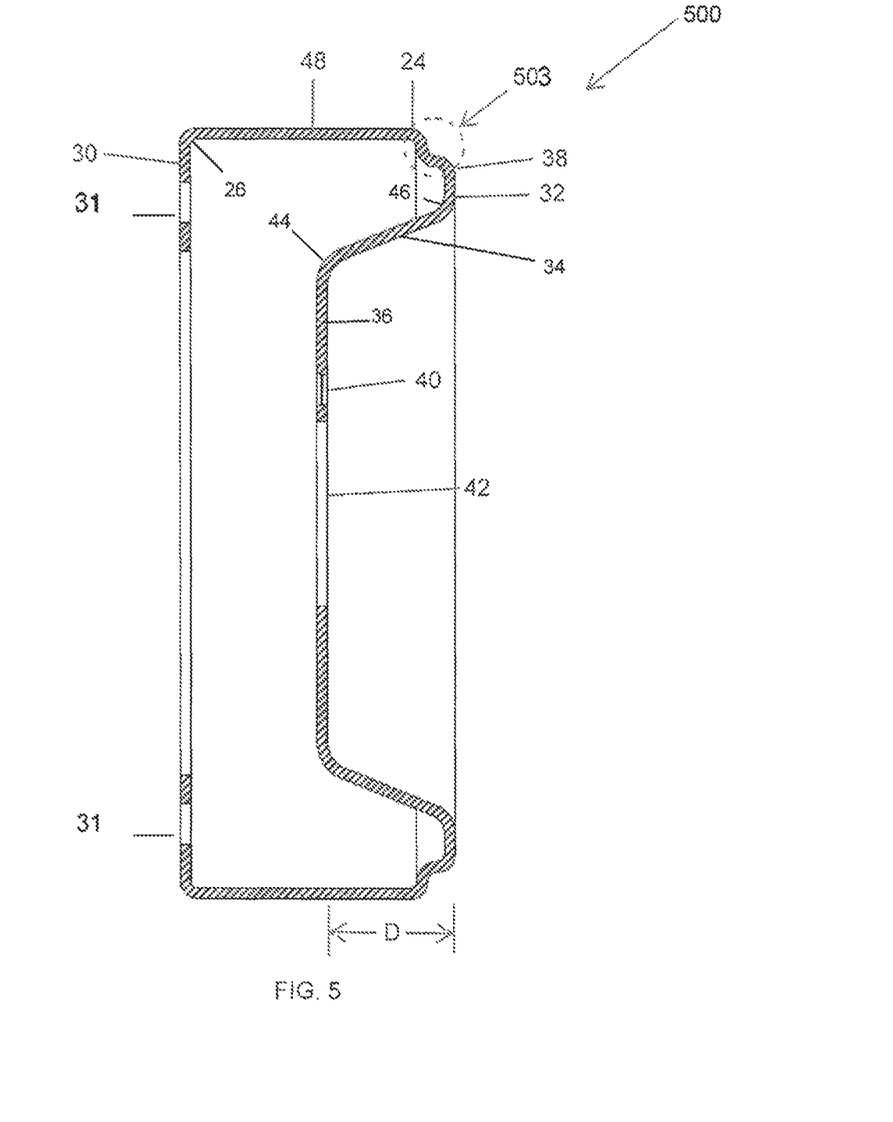
FIG. 5 illustrates a cross-sectional view of an alternate embodiment with a flat rim with a step corner profile at the first annular edge according to the present disclosure.
Figure 6:
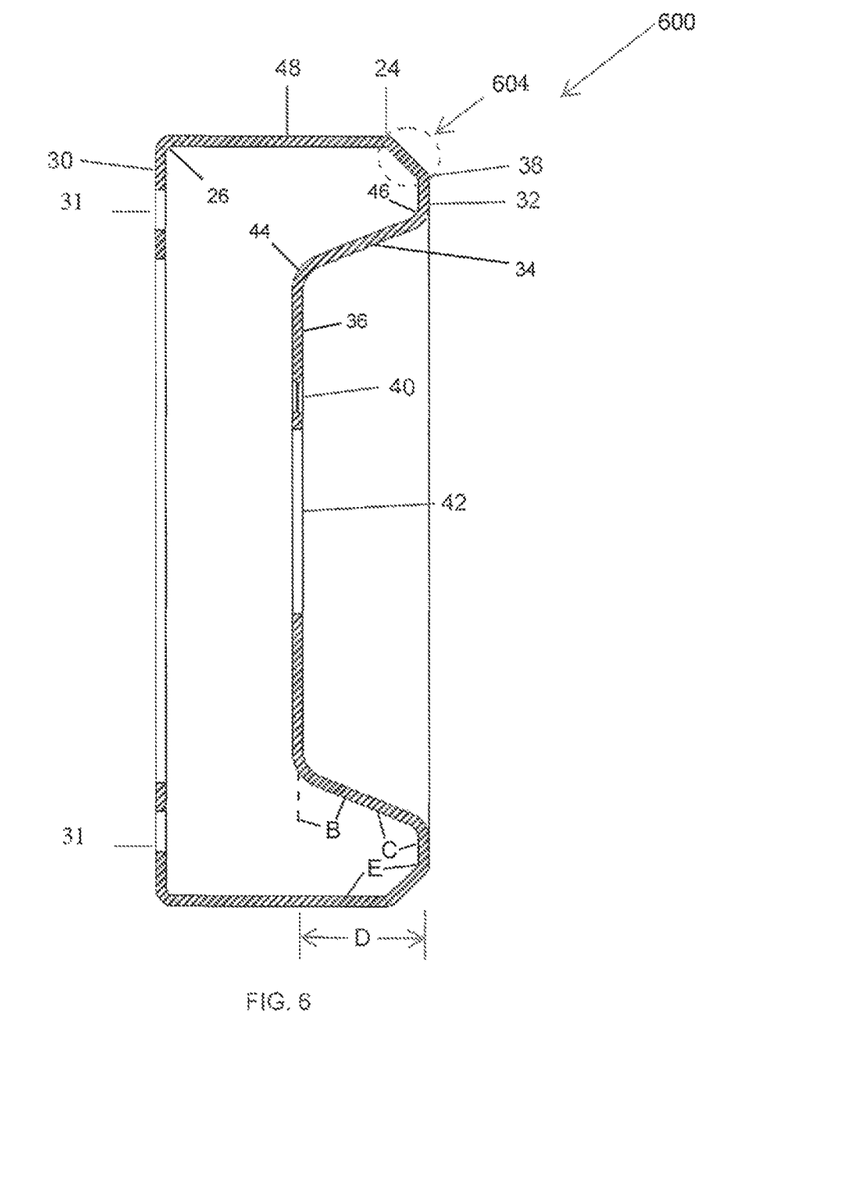
FIG. 6 illustrates a cross-sectional view of an alternate embodiment with a flat rim with a beveled angle corner profile at the first annular edge according to the present disclosure.
Figure 7:
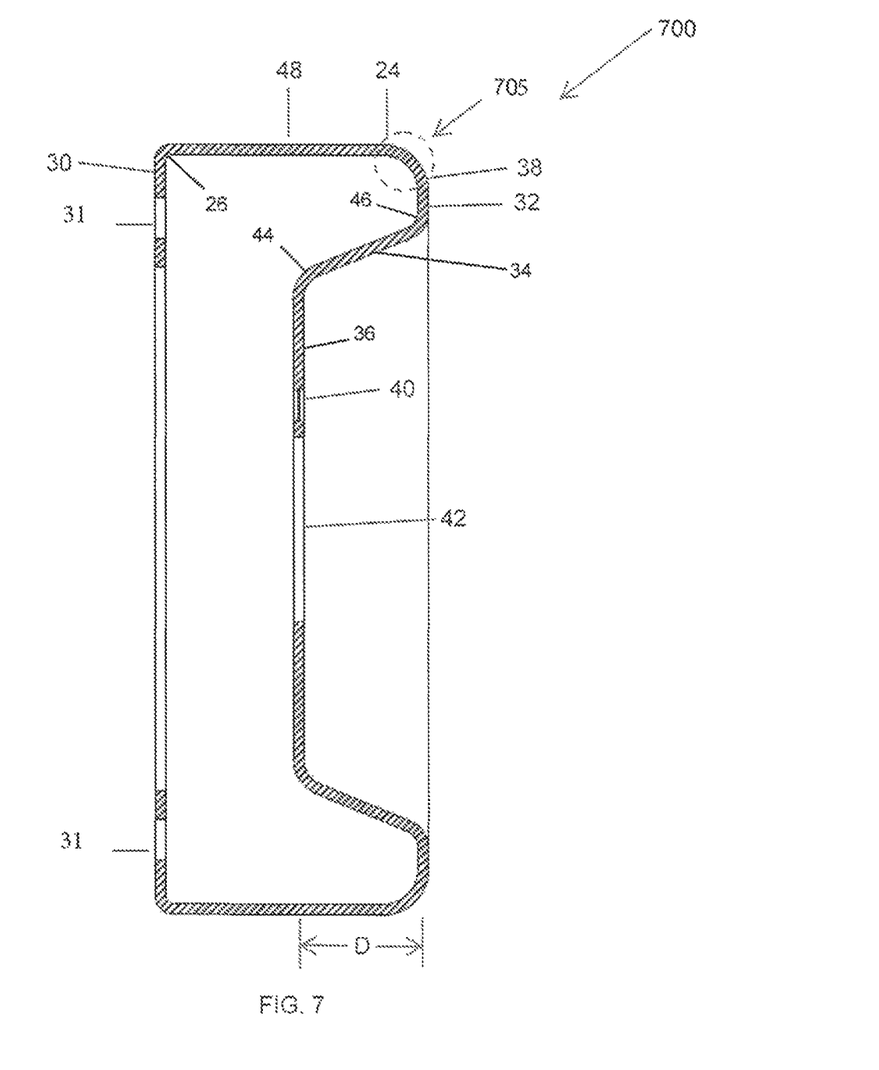
FIG. 7 illustrates a cross-sectional view of an alternate embodiment with a flat rim with a large radius corner profile at the first annular edge according to the present disclosure.

FIG. 5 illustrates another example of a corner profile 503 of a step configuration for the present wheel 500 having a more rounded transition than that depicted in FIG. 3B. This embodiment also illustrates a bolt aperture 40 which is flush to the surface and an extended back flange 30 as compared to the embodiments above. FIGS. 6 and 7 similarly depict additional embodiments 600, 700 to the examples of corner profiles 504, 505 with a beveled angle configuration 604 and large radius configuration 705, respectively. One skilled in the art would recognize that a tire 56 can be bonded or secured to any of the embodiments shown in FIGS. 5-7. In other embodiments, a tire 56 can be bonded or secured to the substantially flat rim base 48 and the annular corner profile 50, in a manner similar to that shown in the example of FIGS. 4A and 4B.

Figure 8A:
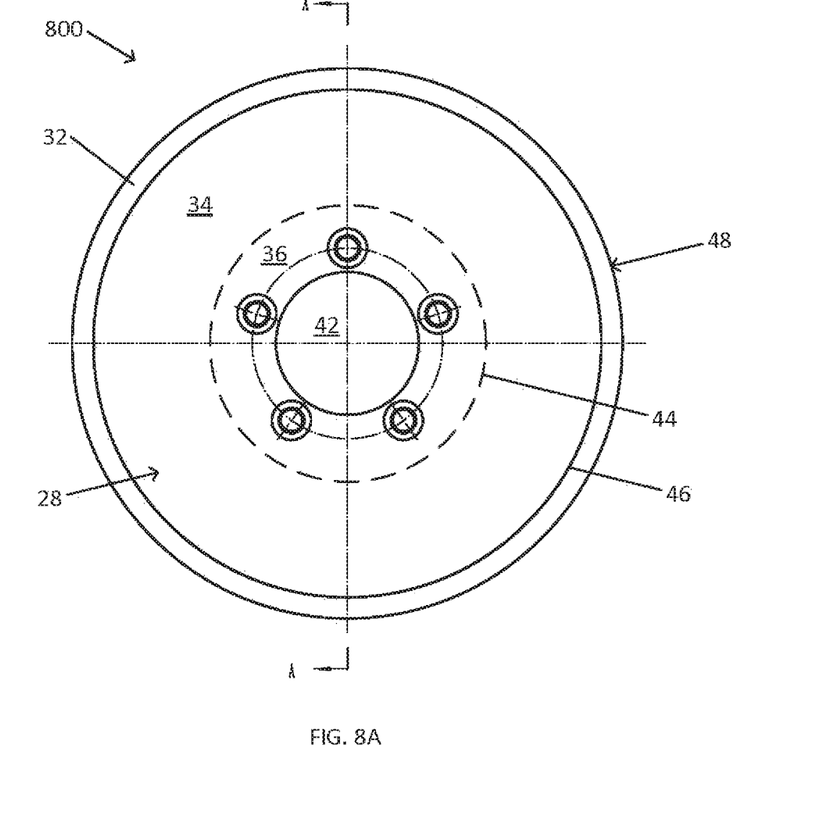
FIGS. 8A and 8B illustrate a front view and a cross-sectional view, respectively, of a non-limiting embodiment of a wheel of the present disclosure.
Figure 8B:
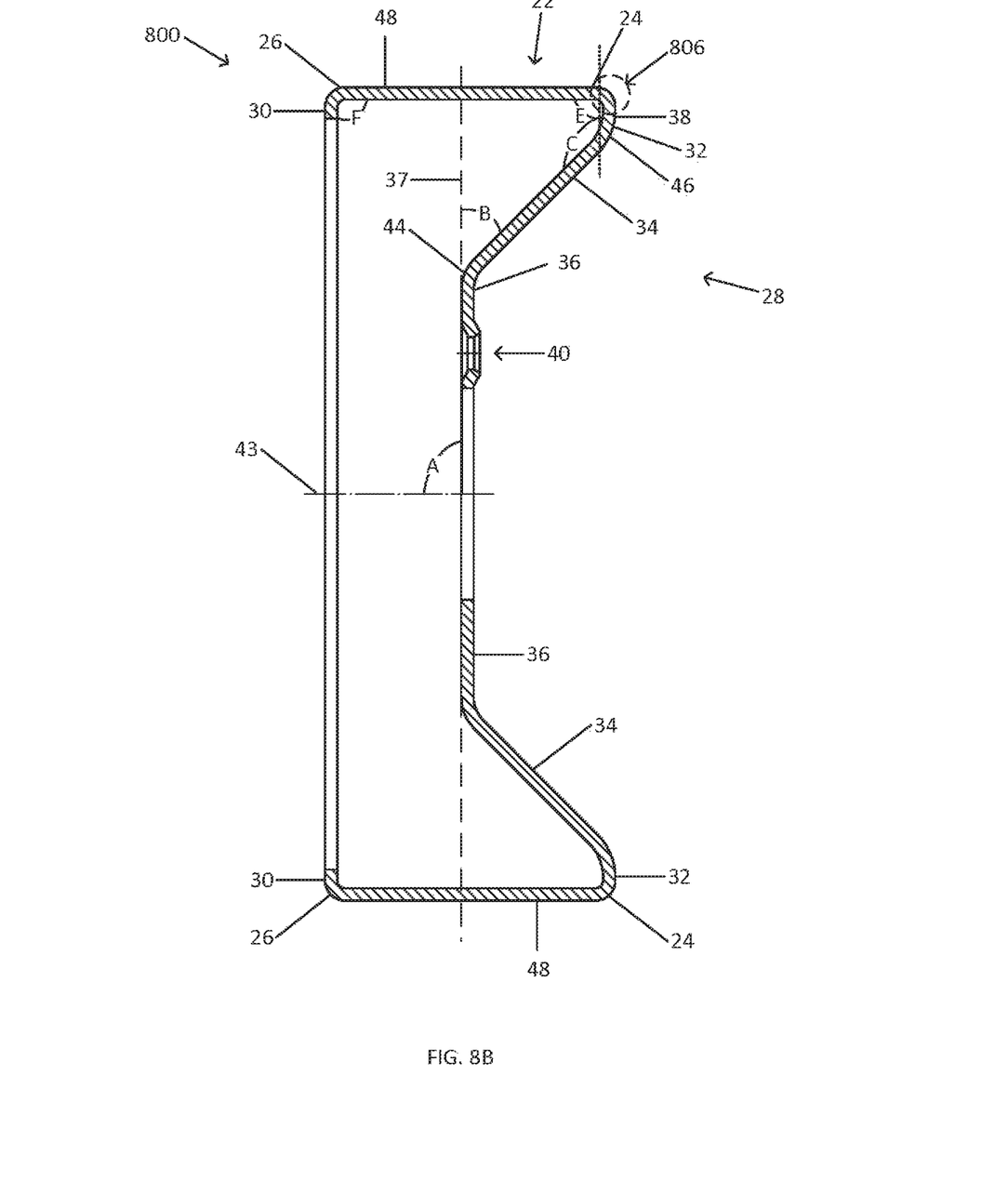

FIGS. 8A and 8B illustrate another example of a wheel of the present disclosure. The wheel 800 has a shortened outer annular face section 32 formed between face exterior edge 38 to the interior edge 46 as compared to FIG. 2. In this example, the corner profile 806 can have a bend with a radius of curvature, providing a contoured cross-section between the first annular edge 24 and the interior edge 46. The outer annular face section 46 need not be substantially planar. The outer annular face section 32 can have a radius of curvature to the interior edge 46, where the transition section 34 meets the outer annular face section 32, that is different from the bend of corner profile 806. In some aspects, the radius of curvature of the outer annular face section 32 can be larger than the radius of curvature of the corner profile 806. The back flange 30 can extend from rim base 48 and be formed with a bend. In some aspects, the radius of curvature of the bend between the rim base 48 and the back flange 30 can be the same as the radius of curvature of the bend of corner profile 806. The back flange 30 can be configured in the same manner as in other embodiments described herein. As can be understood, in some aspects, the back flange 30 can also be extended to include a locking feature or mechanism 31. As shown in this example, the bolt apertures 40 can be chamfered at a specified angle. In other aspects, the bolt apertures 40 can be flush with the center hub section 36.

In this example, the transition section 34 can be substantially planar in cross-section and configured such that the transition section 34 can extend radially outwardly from the center hub section 36 at an angle B. The transition section 34 can extend directly from the center hub section 36 without an intermediate bend or break in the transition from the center hub section 36 at center hub perimeter 44, as depicted in FIG. 8B. The outer annular face section 32 can extend radially outwardly from the transition section 34 at an angle C.

In any one or more aspects, the angles A, B, C, D, E and F can be as described herein above. Further, the wheel 800 can have an offset D from the radial center line 37 as also described herein above. In other aspects, the transition section 34 may be non-planar in cross-section to continue a contoured cross-section.

EXAMPLES

To test the improved flexibility provided by the present wheel, both a curb test and a drop test were conducted. The curb test was conducted by driving a scissor lift vehicle into a curb at least 3 inches tall at approximately a 45° angle. The vehicle was provided with a wheel as depicted in FIGS. 1A and 1B. The wheel successfully absorbed the shock of being driven into the curb, flexing to absorb the impact, and subsequently returning to its original configuration.

A drop test was also conducted. The drop test involved dropping an entire scissor lift vehicle from a height of approximately 12 inches above the ground onto all of its wheels and also again onto initially two of its wheels. In the drop test, all four of the wheels of the scissor lift vehicle were of the embodiment of FIGS. 1A and 1B. The wheels successfully flexed to absorb the impact, returning to their original shape.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A wheel for an industrial vehicle comprising:
    a substantially cylindrical wheel rim including opposed first and second annular edges and a rim base therebetween;
    a hub aperture having a longitudinal axis passing through the hub aperture, the longitudinal axis being parallel to the longitudinal axis of an axle to which the wheel is configured to be mounted;
    a surface extending radially outwardly from the hub aperture to the first annular edge of the wheel rim; and
    a back flange extending radially inwardly from the second annular edge of the wheel rim towards the longitudinal axis, the back flange having a distal end opposite the second annular edge, the back flange formed at an angle with respect to the rim base and having a free inward distal end extending towards the longitudinal axis such that the distal end of the back flange faces towards the longitudinal axis,
    wherein the surface comprises a center hub section extending radially outwardly from the hub aperture, a transition section extending radially outwardly from the center hub section, and an outer annular face section extending radially outwardly from the transition section to the first annular edge of the wheel rim, the outer annular face section positioned outwardly along said longitudinal axis towards the first annular edge from the center hub section and wherein the rim base continues from the outer annular face section at an angle (E) of 90° plus or minus 10°,
    the wheel configured for the industrial vehicle.

2. The wheel of claim 1, wherein the center hub section has a substantially planar cross-section that lies on a center line drawn vertically through a cross-section of the wheel, the center line being drawn equidistantly spaced between the first and second annular edges.

3. The wheel of claim 1, wherein the center hub section has a substantially planar cross-section, and the center hub section being offset either outwardly along said longitudinal axis towards the outer annular face section or inwardly along said longitudinal axis towards the back flange from a center line drawn vertically through a cross-section of the wheel, the center line being drawn equidistantly spaced between the first and second annular edges.

4. The wheel of claim 3, wherein the offset of the center hub section is 30% or less of a distance between the center line and either the outer annular face section or the back flange.

5. The wheel of claim 2, wherein rim base has a substantially planar cross-section, and the center hub section has a substantially planar cross-section and the substantially planar cross-section of the center hub section is oriented substantially perpendicular to the substantially planar cross-section of the rim base.

6. The wheel of claim 1, wherein the transition section has a substantially planar cross-section.

7. The wheel of claim 1, wherein the transition section extends outwardly from the center hub section at an angle (B) and the angle (B) is in the range of 15 to 60 degrees with respect to a center line drawn vertically through a cross-section of the wheel, the center line being drawn equidistantly spaced between the first and second annular edges.

8. The wheel of claim 1, wherein the outer annular face section extends outwardly from the transition section at an angle (C) and the angle (C) is in a range of 120 degrees to 165 degrees with respect to the annular face section parallel to a center line drawn vertically through a cross-section of the wheel, the center line being drawn equidistantly spaced between the first and second annular edges.

9. The wheel of claim 1, wherein the center hub section extends radially outwardly from the hub aperture at an angle (A) of substantially 90° with respect to the longitudinal axis.

10. The wheel of claim 1, further comprising a concave step between the outer annular face and the wheel rim.

11. The wheel of claim 1, further comprising a convex radius section between the outer annular face and the wheel rim.

12. The wheel of claim 1, wherein the wheel is a one-piece wheel.

13. The wheel of claim 1, wherein the wheel is a one-piece design formed of a metal piece.

14. The wheel of claim 1, wherein the outer annular face section is contoured in cross-section.

15. The wheel of claim 1, wherein the back flange is substantially planar in cross-section.

16. The wheel of claim 1, wherein the wheel rim is designed to receive and secure in place a tire.

17. The wheel of claim 1, wherein the angle between the wheel rim and the back flange is an angle (F) in the range of between 45 degrees to 135 degrees with respect to a planar line drawn between the first annular edge and the second annular edge of the rim base.

18. The wheel of claim 15, wherein the substantially planar back flange is substantially parallel to a radial center line of the wheel.

19. The wheel of claim 1, wherein the industrial vehicle is selected from the group consisting of a scissor lift vehicle, an aerial work platform vehicle, forklift vehicle and a ground support equipment vehicle.

20. The wheel of claim 1, wherein the transition section extends outwardly from the center hub section at an angle (B) and the angle (B) is in the range of 15 to 60 degrees with respect to a center line drawn vertically through a cross-section of the wheel, the center line being drawn equidistantly spaced between the first and second annular edges, and wherein the outer annular face section extends outwardly from the transition section at an angle (C) and the angle (C) is in a range of 120 degrees to 165 degrees with respect to a line drawn from the interior edge to the first annular edge parallel to a center line drawn vertically through the cross-section of the wheel, the center line being drawn equidistantly spaced between the first and second annular edges.

\* \* \* \* \*